US006832308B1

(12) United States Patent
Sicaras et al.

(10) Patent No.: US 6,832,308 B1
(45) Date of Patent: Dec. 14, 2004

(54) APPARATUS AND METHOD FOR INSTRUCTION FETCH UNIT

(75) Inventors: William G. Sicaras, Fort Collins, CO (US); Joe R. Butler, Fort Collins, CO (US); Don R. Weiss, Fort Collins, CO (US); Lakshmikant Mamileti, Denver, CO (US); Reid J. Reidlinger, Fort Collins, CO (US); Dean A. Mulla, Saratoga, CA (US)

(73) Assignees: Intel Corporation, Santa Clara, CA (US); Hewlett Packard Corporation, Palo Alto, CA (US)

( * ) Notice: Subject to any disclaimer, the term of this patent is extended or adjusted under 35 U.S.C. 154(b) by 0 days.

(21) Appl. No.: 09/505,249

(22) Filed: Feb. 15, 2000

(51) Int. Cl.[7] .................................................. G06F 9/30
(52) U.S. Cl. ........................ 712/214; 711/108; 712/225
(58) Field of Search ................................ 712/214, 205, 712/207, 225; 711/108; 710/112

(56) References Cited

U.S. PATENT DOCUMENTS

| 3,349,375 A | * | 10/1967 | Seeber et al. ............... 711/108 |
| 4,532,606 A | | 7/1985 | Phelps |
| 4,682,284 A | | 7/1987 | Schrofer |
| 4,691,279 A | * | 9/1987 | Danilenko et al. .......... 711/108 |
| 4,729,093 A | * | 3/1988 | Mothersole et al. ........ 712/207 |
| 5,325,522 A | | 6/1994 | Vaughn |
| 5,423,048 A | | 6/1995 | Jager |
| 5,450,560 A | | 9/1995 | Bridges et al. |
| 5,497,477 A | | 3/1996 | Trull |
| 5,581,775 A | | 12/1996 | Katz et al. |
| 5,592,432 A | | 1/1997 | Vishlitzky et al. |
| 5,809,280 A | | 9/1998 | Chard et al. |
| 5,822,560 A | * | 10/1998 | Pflum ......................... 712/214 |
| 5,930,359 A | * | 7/1999 | Kempke et al. ............. 713/160 |
| 5,948,060 A | | 9/1999 | Gregg et al. |
| 6,012,134 A | | 1/2000 | McInerney et al. |
| 6,061,777 A | | 5/2000 | Cheong et al. |
| 6,098,166 A | | 8/2000 | Leibholz et al. |
| 6,173,369 B1 | | 1/2001 | Nguyen et al. |
| 6,185,660 B1 | | 2/2001 | Mulla et al. |
| 6,226,763 B1 | | 5/2001 | Fu et al. |
| 6,240,483 B1 | | 5/2001 | Gutta et al. |
| 6,292,810 B1 | | 9/2001 | Richards |
| 6,363,474 B1 | | 3/2002 | McCulley et al. |
| 6,381,678 B2 | | 4/2002 | Fu et al. |

OTHER PUBLICATIONS

IBM Technical Disclosure Bulletin, "Content–Addressable Memory Cell Having Only Six Transistors", vol. 26, Issue 8, pp. 4208–4209, Jan. 1, 1984.*
IBM Technical Disclosure Bulletin, "Content–Addressable Memory Structures", vol. 31, Issue 10, pp. 461–466, Mar. 1, 1989.*
IBM Technical Disclosure Bulletin, "High Performance Static Content–Addressable Memory Cell", vol. 32, Issue 3A, pp. 478–479, Aug. 1, 1989.*
IBM Technical Disclosure Bulletin, "Contents Addressable Memory", vol. 30, Issue 10, pp. 164–168, Mar. 1, 1988.*

* cited by examiner

Primary Examiner—David Wiley
Assistant Examiner—Scott M. Collins
(74) Attorney, Agent, or Firm—Blakely, Sokoloff, Taylor & Zafman LLP

(57) ABSTRACT

An apparatus is described comprising a signal indicative of which of a plurality of data structures stored in a queue desire to issue from the queue. The apparatus also has a content addressable memory having a plurality of cells, where each of the cells is configured to store one of the data structures. The apparatus also has an output from at least one of the cells that is indicative of whether the data structure within the at least one of the cells has issued from the queue. The apparatus also has an input to the at least one of the cells coupled to the signal.

48 Claims, 15 Drawing Sheets

TABLE 1 ($t_1$)

| QUEUE CELL | QUEUE CELL CONTENTS | STATUS |
|---|---|---|
| 2030 | RABid : 05 | issued |
| 2031 | RABid : 03 | not issued |
| 2032 | RABid : 00 | issued |
| 2033 | RABid : 07 | not issued |
| 2034 | RABid : 06 | not issued |
| 2035 | empty | |
| 2036 | empty | |
| 2037 | empty | |

$\overline{wt_1}$ "don't want to issue" vector 240a

RABid : 00 — 1
RABid : 01 — 1
RABid : 02 — 1
RABid : 03 — 0
RABid : 04 — 1
RABid : 05 — 1
RABid : 06 — 0
RABid : 07 — 0

TABLE 2 ($t_2$)

| QUEUE CELL | QUEUE CELL CONTENTS | STATUS |
|---|---|---|
| 2030 | RABid : 05 | issued |
| 2031 | RABid : 03 | not issued |
| 2032 | RABid : 07 | not issued |
| 2033 | RABid : 06 | not issued |
| 2034 | empty | |
| 2035 | empty | |
| 2036 | empty | |
| 2037 | empty | |

240b

RABid : 00 — 1
RABid : 01 — 1
RABid : 02 — 1
RABid : 03 — 0
RABid : 04 — 1
RABid : 05 — 1
RABid : 06 — 0
RABid : 07 — 0

FIG. 2B

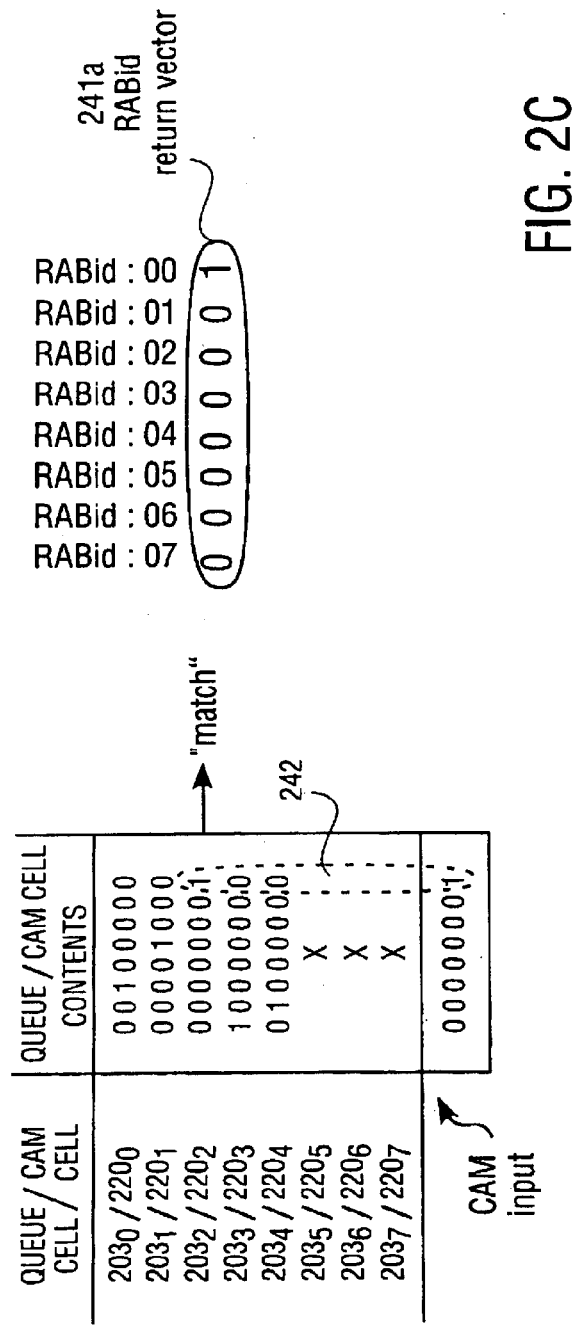

APPARATUS AND METHOD FOR INSTRUCTION FETCH UNIT

FIELD OF THE INVENTION

The field of invention relates to processor technology generally; and more specifically, to methods and apparatus that may be used for an instruction fetch unit.

BACKGROUND

Processors are used in computing systems and are implemented within a semiconductor chip. Processors execute instructions in order implement a software program. The instructions used to implement a software program are stored in a memory structure (e.g., an L1 cache, L2 cache and/or system memory) and fetched by the processor prior to their being executed. Each instruction has a corresponding address that is used to obtain the instruction from a particular memory structure location.

FIG. 1 shows a circuit 100 associated with the portion of a processor that fetches instructions. Array 108 has a series of locations $101_{00}$ through $101_n$ that each store an instruction address (e.g., instruction addresses $ADDRESS_1$, $ADDRESS_2$ or $ADDRESS_3$). Array 108 serves as a temporary holding place for up to n instruction addresses. The instruction addresses waiting in array 108 have been determined by other logic (not shown in FIG. 1) that determines or otherwise identifies which instructions (from the range of instructions supported by the processor) should be fetched by the processor.

Each instruction address within array 108 has a corresponding RABid value. The RABid value is data structure used to identify which array location $101_{00}$ through $101_n$ a particular instruction address is stored in. For example, $ADDRESS_1$ has a corresponding RABid value of "02" which reflects the fact that $ADDRESS_1$ is stored in array location $101_{02}$. Similarly, $ADDRESS_2$ has a corresponding RABid value of "04" which reflects the fact that $ADDRESS_2$ is stored in array location $101_{04}$ and $ADDRESS_3$ has a corresponding RABid value of "00" which reflects the fact that $ADDRESS_3$ is stored in array location $101_{00}$.

For each address offered at input node 102b, the address's corresponding RABid value is used to control which array location $101_{00}$ through $101_n$ will be used to store the address. For example, as seen in FIG. 1, the RABid value is used to select (via the select node 102a) which multiplexor 102 output is enabled for a particular address at input 102b. As another example (not shown in FIG. 1), the multiplexor 102 and its outputs 102c could be respectively replaced with write logic and address/data buses. In this example, the RABid value is used to generate a write address that corresponds to the proper array location. The address is written into the proper array location via the address/data buses.

Eventually an address within array 108 "issues" as an instruction fetch. That is, when the proper moment arrives for an address within array 108 to be used as an instruction fetch from the processor, the proper address is read or otherwise received from its location within array 108 and directed to a memory structure address bus. Array control circuit 107 determines when a particular address is to be issued from the array 108. That is, array control circuit 107 controls: 1) which address is read from array 108; and 2) when the particular address is read from the array 108.

As a basic example, array control circuit 107 stores each "active" RABid (i.e., a RABid currently having an address in its corresponding array 108 location) in a first-in-first-out (FIFO) queue 103. The queue 103 typically has a depth 106 equal to the number "n" of array 108 locations. This allows the array control circuit 107 to successfully order the issuing of instruction addresses from array 108 in instances where array 108 is filled.

The RABids are stored in the queue 103 in the order in which they are used to store addresses in array 108. For example, if $ADDRESS_1$ was first to arrive at input 102b followed by $ADDRESS_2$ and then $ADDRESS_3$, the queue 103 stores the RABids in the following order: RABid:02, RABid:04, RABid:00. Thus RABid:02 is serviced before RABid:04 and RABid:04 is serviced before RABid:00.

When a RABid is serviced from queue 103, its value is used to issue the RABid's corresponding instruction address. That is, RABid:02 will be used to issue $ADDRESS_1$ from array location $101_{02}$, RABid:04 will be used to issue $ADDRESS_2$ from array location $101_{04}$ and RABid:00 will be used to issue $ADDRESS_3$ from array location $101_{00}$. This is accomplished by directing each RABid value from queue 103 to a unit that controls the issuing of address from array 108. For example, as seen in FIG. 1, the RABid is coupled to the selection control 104a of a multiplexor 104. Alternatively (not shown in FIG. 1), the multiplexor 104 and its inputs 104a could be respectively replaced with read logic and address/data buses. In this example, the RABid value from queue 103 is used to generate a read address that corresponds to the proper array location. The address is read from the proper array location via the address/data buses. The number of outstanding issues are controlled by queue control circuit 105. When an instruction is successfully fetched, the RABid value used for its address is returned to array control circuit 107. Thus, if the current number of outstanding issues is at its maximum allowable value, the queue control circuit 105 can trigger the servicing of the next RABid in queue 103 upon the return of a previously serviced RABid value.

SUMMARY OF INVENTION

An apparatus is described comprising a signal indicative of which of a plurality of data structures stored in a queue desire to issue from the queue. The apparatus also has a content addressable memory having a plurality of cells, where each of the cells is configured to store one of the data structures. The apparatus also has an output from at least one of the cells that is indicative of whether the data structure within the at least one of the cells has issued from the queue. The apparatus also has an input to the at least one of the cells coupled to the signal.

BRIEF DESCRIPTION OF THE DRAWINGS

The present invention is illustrated by way of example, and not limitation, in the Figures of the accompanying drawings in which:

FIG. 2b shows the state of the queue 203 shown in FIG. 2a at two different times t1 and t2.

FIG. 2c shows an embodiment of how the CAM 220 of FIG. 2a finds a match between a first input vector and the contents of the CAM 220.

FIG. 3a shows a method of cycling the array control circuit 207 of FIG. 2a.

FIG. 3b shows a methodology for the array control circuit of FIG. 2a.

FIG. 6 shows a transistor level design that may be used for the CAM 220 shown in FIG. 2a.

DETAILED DESCRIPTION

An apparatus is described comprising a signal indicative of which of a plurality of data structures stored in a queue desire to issue from the queue. The apparatus also has a content addressable memory having a plurality of cells, where each of the cells is configured to store one of the data structures. The apparatus also has an output from at least one of the cells that is indicative of whether the data structure within the at least one of the cells has issued from the queue. The apparatus also has an input to the at least one of the cells coupled to the signal.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims.

Figure 1:
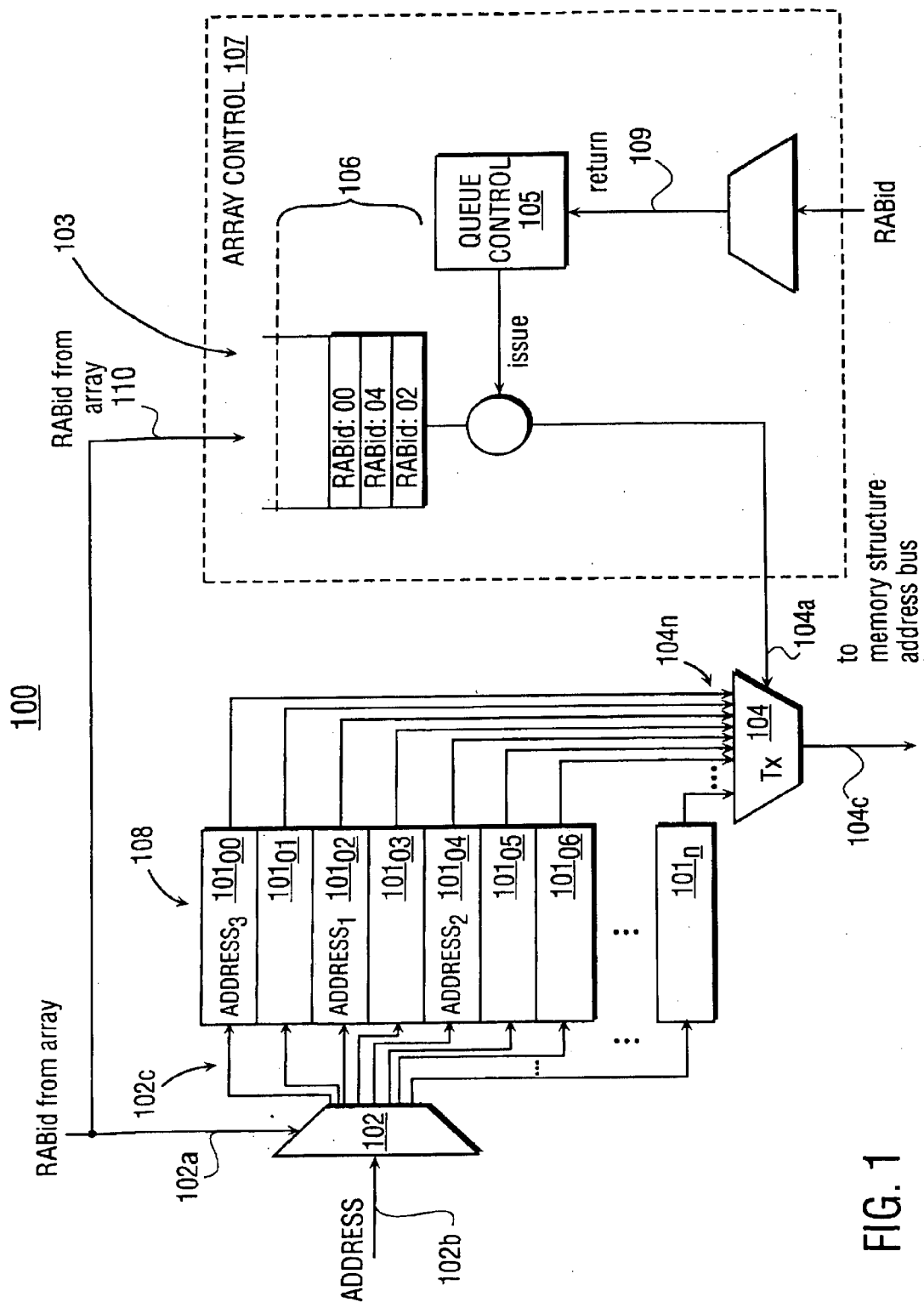
FIG. 1 shows an instruction fetch unit.
Figure 2A:
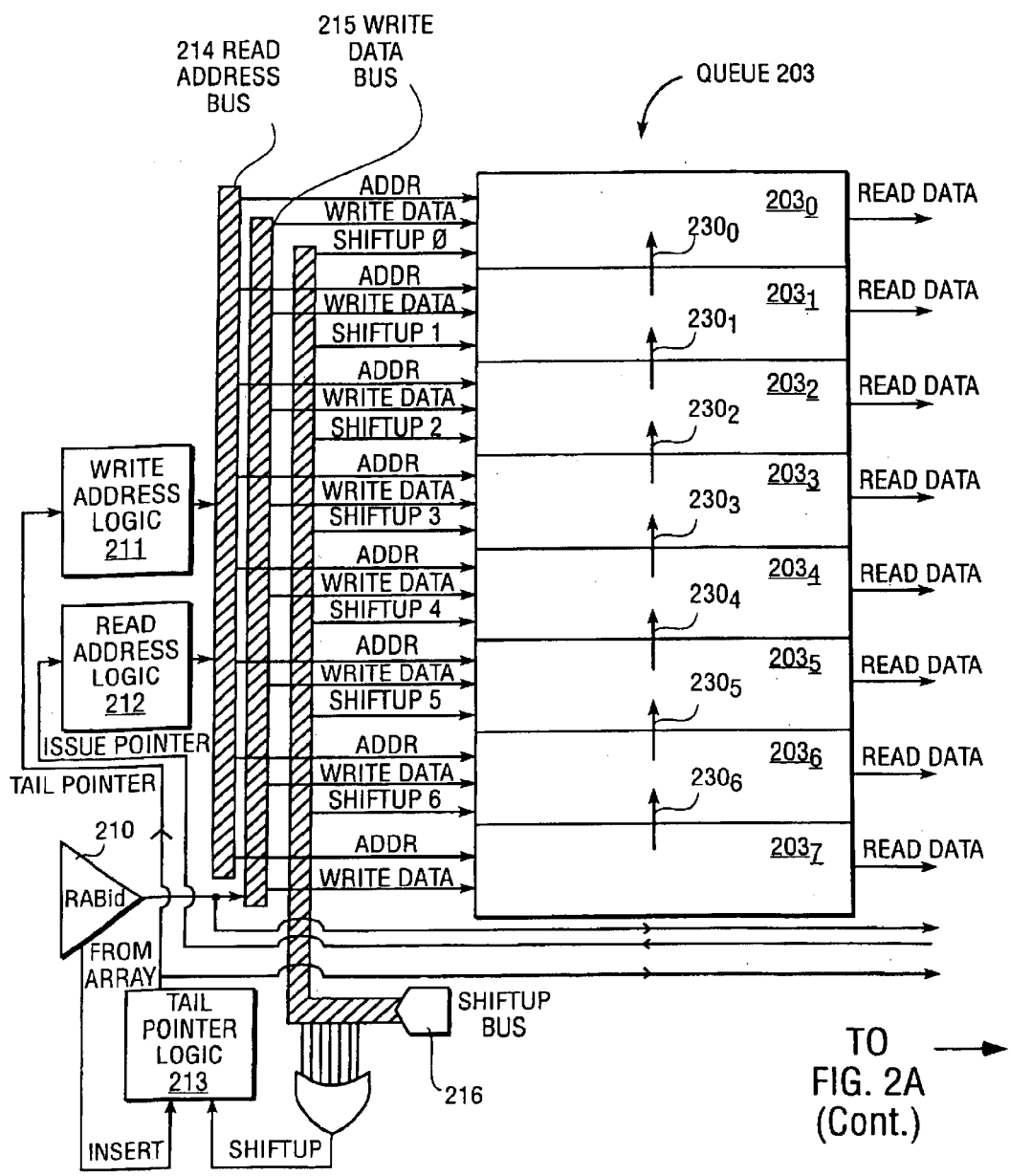
FIG. 2a shows an embodiment of an array control circuit 207 that may be used for the instruction fetch unit shown in FIG. 1.
Figure 2A:
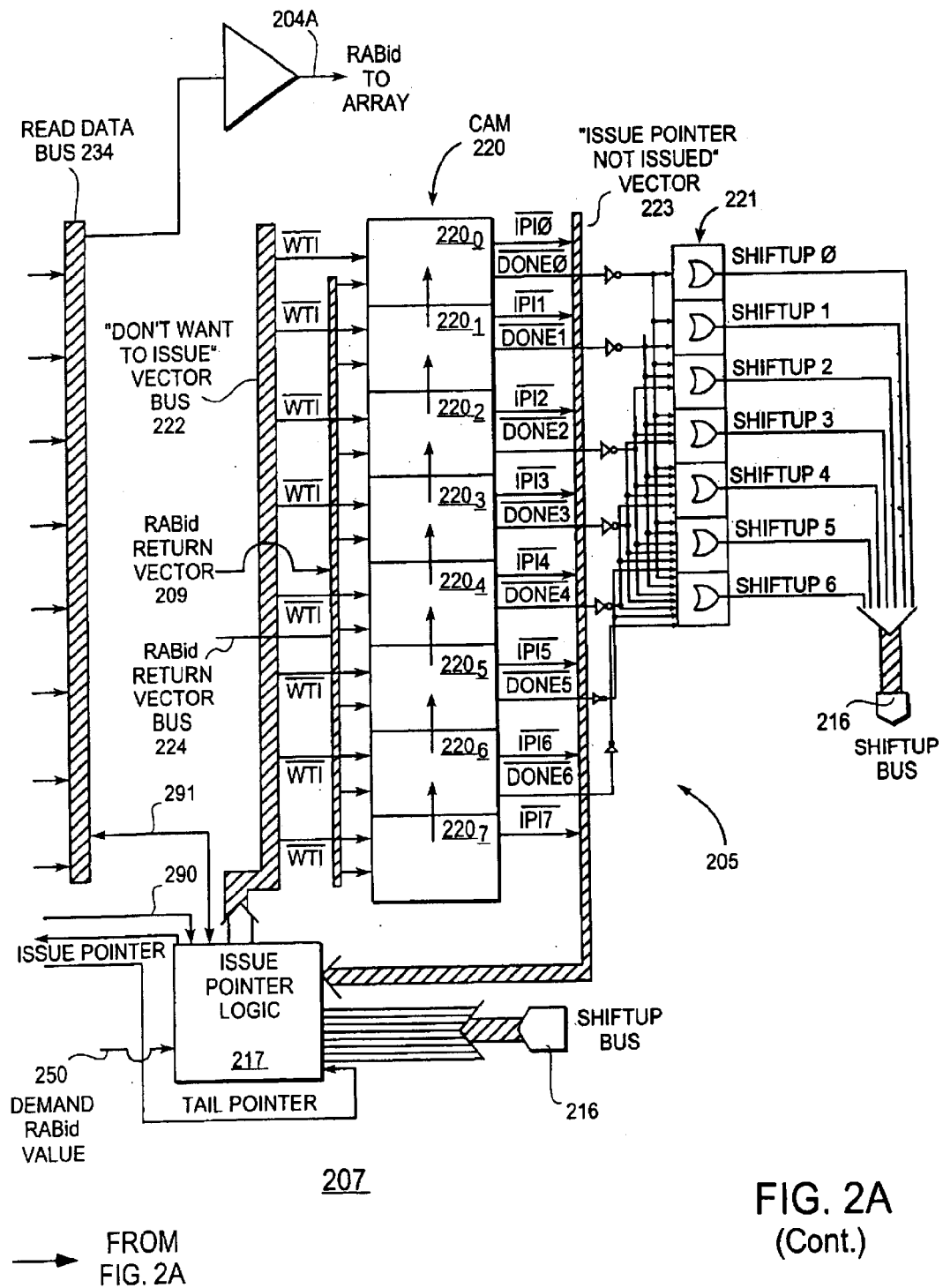

FIG. 2a shows an embodiment of an array control circuit 207 that may be used for the array control circuit 107 of FIG. 1. Comparing the array control circuits 107, 207 of FIGS. 1 and 2a, the RABid input 210 from the array corresponds to RABid input 110 from the array. Also, the RABid output 204a to the array corresponds to the RABid output 104a to the array and the returned RABid 209 corresponds to the returned RABid 109.

Queue 203 corresponds to queue 103. Queue 203 is an arrangement of storage cells $203_0$ through $203_7$ such as register locations or memory locations. Note that in the particular example of FIG. 2a, queue 203 has eight cells $203_0$ through $203_7$. Consistent with designer preference, however, other embodiments may have queue 203 depths greater than or less than eight cells.

As discussed in more detail ahead, array control circuit 207 may be configured to issue RABids according to methods more complicated than the simple FIFO method discussed with respect to the array control circuit 107 of FIG. 1. Because of this, RABids sent from the array (via input 210) for entry to the queue 203 are written into a particular cell according to the current value of a tail pointer. That is, the tail pointer "points" to the proper queue 203 cell that an incoming RABid from the array should be written into. The write address logic 211 accepts the tail pointer value from the tail pointer logic 213 in order to write the incoming RABid to the proper queue 203 cell along write data bus 215.

Furthermore, because array control circuit 207 may be configured to issue RABids according to methods more complicated than the simple FIFO method discussed with respect to the array control circuit 107 of FIG. 1, RABids are issued from queue 203 according to the value of an issue pointer that "points" to the cell holding the RABid to be issued. In order to issue a RABid from queue 203 to the array, read address logic 212 establishes the proper address on read address bus 214.

Note that the read address logic 212 accepts the current value of the issue pointer from the issue pointer logic 217 in order to determine the proper read address. When the proper address is established on read address bus 214, the RABid appears on the read data bus 234 and is directed toward the array at output 204a. Note that alternate architectural schemes may be employed such as a bi-directional data bus (i.e., read data bus 234 and write data bus 215 are merged together as a single data bus) or a multiplexor scheme similar to the multiplexor scheme used to write and read to/from array 108 of FIG. 1.

Consistent with the operation of a queue, queue 203 can "shift up" the contents of a cell when a RABid has successfully issued. Referring to FIGS. 2a and 2b, note that FIG. 2b shows at Table 1 a queue 203 state at a particular time t1. At time t1, the queue has already issued both RABid:05 and RABid:00. Note that RABid:00 has issued before RABid:03. This is possible since array control circuit 207 can issue RABids beyond a simple FIFO technique. For example, RABid:00 may correspond to a "high priority" instruction fetch that needs to issue before RABid:03.

The RABids within queue 203 that have not issued as of time t1 are indicated by the "don't want to issue" vector 240a. The "don't want to issue" vector (which is the logical inverse of "want to issue" wti) is a vector that records the status of those RABids that need to issue and those RABids that do not need to issue. RABids that have issued to the array no longer need to issue. Hence, it may be said that such RABids "don't want to issue". As seen in the "don't want to issue" vector 240a, RABid:05 and RABid:00 are given logical high values to reflect the fact that both RABids issued as of time t1. Also, since RABid:01, RABid:02 and RABid:04 are currently not in use, these RABids do not need to issue either.

Thus, as seen in the "don't want to issue" vector 240a, the values for RABid:01, RABid:02 and RABid:04 also have a logical high value. The remaining RABids within the queue 203 still need to issue and may be said to "want to issue". Hence, as seen in the "don't want to issue" vector 240a, RABid:03, RABid:07 and RABid:06 are each given logical low values. The "don't want to issue" vector, as described in more detail further ahead, is used to support sophisticated issuing techniques beyond a simple FIFO.

A RABid is deemed to have successfully issued when it returns to array control circuit 207 (which is reflected in the appearance of a signal at the RABid return vector bus 224). A RABid returns to the array control circuit 207 after it has been used to obtain an address from the array (108 of FIG. 1) that subsequently fetches an instruction from a memory structure (e.g., L1 cache, L2 cache or system memory).

When a RABid returns to the array control circuit 207 (i.e., when it is has been deemed successfully issued) it may be removed from queue 203. In the example of FIG. 2b, assume the issued RABid:00 returns to array control circuit 207 between times t1 and t2. The queue 203 state at time t2 is tabulated in Table 2. At time t2, the RABid:00 value is removed from the queue by "shifting up" all the RABids beneath it. That is, comparing the queue states of times t1 and t2, RABid:07 and RABid:06 have each shifted up one cell location. RABid:07 has shifted up from cell $203_3$ to $203_2$ and RABid:06 has shifted up from cell $203_4$ to $203_3$. Referring to FIG. 2a, arrows $230_0$ through $230_6$ indicate the capability of the queue 203 to shift the contents of a cell into the cell just above it. For example, arrow $230_4$ indicates cell $203_5$ can shift its contents into cell $203_4$ just above it.

Thus, by way of the shifting up technique discussed above, the queue 203 may effectively rid itself of a RABid that has successfully issued to the array. As seen in FIG. 2a, cells $203_0$ through $203_6$ each have a corresponding shiftup input SHIFTUP0 through SHIFTUP6. In the example of FIG. 2a, when a logic high is presented at a particular shiftup input, the contents from the cell beneath the activated shiftup input are shifted into the cell having the activated input. For example, if SHIFTUP6 is logic high, the contents of cell $203_7$ are shifted into cell $203_6$ (i.e., the pathway represented by arrow $230_6$ is enabled).

In alternate embodiments, shiftup inputs may be used to shift the contents of an activated cell into the cell above it. For example, if SHIFTUP6 was logic high, the contents of cell $203_6$ would be shifted into cell $203_5$. In such an alternate embodiment, the SHIFTUP0 input may be removed from cell $203_0$ and a SHIFTUP7 input should be added to cell $203_7$.

The shiftup inputs SHIFTUP0 through SHIFTUP6, as shown in FIG. 2a, together form the shiftup bus 216. Shiftup bus 216 is the collection of shiftup inputs SHIFTUP0 through SHIFTUP6. The shiftup bus 216 is produced by logic structure 221 associated with queue control circuit 205. Queue control circuit 205 approximately corresponds to the queue control circuit 105 of FIG. 105. Queue control circuit 205 is different than queue control circuit 105 of FIG. 1, however, since queue control circuit 105 can only implement a simple FIFO.

Associated with queue control circuit 205 is a content addressable memory (CAM) 220. CAMs are used to identify a match between an input to a cell and a value stored in the cell. In an embodiment, CAM cells $220_0$ through $220_7$ are respectively coupled to queue cells $203_0$ through $203_7$. Respectively coupled means: CAM cell $220_0$ is coupled to queue cell $203_0$, CAM cell $220_1$ is coupled to queue $203_1$, CAM cell $220_2$ is coupled to queue cell $203_2$, etc.

In one embodiment, the CAM cells $220_0$ through $220_7$ are not distinguishable from the queue cells $203_0$ through $203_7$. That is, queue 203 is physically merged with CAM 220 such that a single cell is able to perform both the RABid queuing associated with queue 203 and the match identification performed by CAM 220. In alternate embodiments, CAM cells $220_0$ through $220_7$ are distinguishable from the queue cells $203_0$ through $203_7$. That is, the cells associated with CAM 220 are separate entities than the cells associated with queue 203. In these alternate "distinguishable" cell embodiments, in order to perform match identification, the CAM cells $220_0$ through $220_7$ may be configured to hold a duplicate copy (respectively) of the RABid values within queue 203; or the CAM cells $220_0$ through $220_7$ may be configured to sense or otherwise use (respectively) the RABid values within queue 203.

The coupling between the queue 203 cells and CAM 220 cells allows, the CAM 220 to find matches between the inputs presented to the CAM 220 (such as the inputs associated with the "don't want to issue" vector bus 222 and the RABid return vector bus 224) and the contents within each of the queue cells $203_0$ through $203_7$. FIG. 2c provides an example.

Referring to Table 3 of FIG. 2c, note that each RABid value is presented with an embodiment of its binary representation. As seen in Table 3, RABid:00 is actually represented by "00000001", RABid:01 is actually represented by "00000010", etc. Table 4 shows the queue state displayed in Table 1 of FIG. 2b implemented with the RABid binary values shown in Table 3 of FIG. 2c. Note that since each queue cell $203_0$ through $203_7$ is respectively coupled to each CAM cell $220_0$ through $220_7$ as discussed above, Table 4 lists the CAM 220 cell contents along with the queue 203 cell contents. Note that each queue/CAM cell is eight bits deep since, in this embodiment, each RABid is represented with eight bits.

Recall from FIG. 2b that in between time t1 and time t2, the RABid:00 value was returned (causing the "shiftup" discussed above). Upon arrival of a returned RABid value, a RABid return vector is formed. The RABid vector 241a formed after the arrival of the RABid:00 value is shown in FIG. 2c. The RABid return vector 241a is organized similar to the "don't want to issue" vector 240a of FIG. 2b. That is, each vector component corresponds to a RABid value (e.g., the rightmost vector component corresponds to RABid:00 while the leftmost vector component corresponds to RABid:07). Note that the particular RABid return vector 241a shown in FIG. 2c corresponds to the return of the RABid:00 value since the vector component corresponding to RABid:00 (the rightmost) is a logic high.

The RABid return vector 241a is also shown at the bottom of Table 4 to indicate its use as an input to the CAM. Note that in FIG. 2a, the RABid return vector bus 224 presents the RABid return vector to each cell $220_0$ through $220_7$. Each cell $220_0$ through $220_7$ in the CAM 220 checks to see if the RABid return vector 241a matches the contents of the cell. Because each component of the RABid return vector 241a corresponds to a RABid value (and because the RABid values are represented as shown in Table 3), each CAM cell only needs to check for a match of logic high values between the input vector 241a and the contents of the cell. Such a match 242 is shown in FIG. 2c between the RABid return vector and the contents of CAM cell $220_2$. Note the contents of CAM cell $220_2$ corresponds to RABid:00 which demonstrates the CAM 220 properly matched the input vector with the contents of the CAM 220.

Referring to FIG. 2a, a match between the RABid return vector (presented on the RABid return vector bus 224) and the content of a particular CAM 220 cell produces a match signal at the CAM output. In FIG. 2a, the "done" output of a CAM cell indicates a match. Note that in the particular embodiment of FIG. 2a, the "done" output from the CAM itself is active low. To correct for the active low, an inverter may be placed between the CAM output and logical structure 221.

Logical structure 221 is configured to indicate those queue 203 cells that should have present cell data written over by lower cell data. Referring to FIGS. 2a, 2b and 2c, recall that the return of RABid:00 caused the shifting up activity of queue cells $203_2$, $203_3$ and $203_4$ (comparing tables 1 and 2 of FIG. 2b). Table 4 of FIG. 2c shows the CAM can properly identify that the returned RABid value (RABid:00) is located in queue/CAM cell $203_2/220_2$. The "done" output from CAM cell $220_2$ will produce logic high values at the logical structure 221 outputs SHIFTUP2 through SHIFTUP6. These, in turn, properly rewrite the contents of each of the queue cells $203_2$ through $203_6$ with the data beneath each of the these cells.

Recall from the discussion FIG. 2b that the RABids within queue 203 that need to issue at any time may be indicated by the "don't want to issue" vector 240a. As discussed, the "don't want to issue" vector (which is the logical inverse of "want to issue" wti) is a vector that records the status of those RABids that need to issue and those RABids that do not need to issue. Referring to FIG. 2a, the "don't want to issue" vector is presented on the "don't want to issue" vector bus 222 by the issue pointer logic 217.

The "don't want to issue" vector bus 222 couples the "don't want to issue" vector to each CAM cell $220_0$ through $220_7$. Similar to the approach described just above with respect to the RABid return vector, each CAM cell $220_0$ through $220_7$ is configured to identify a match between the "don't want to issue" vector and the contents of the cell. An example is shown in FIG. 2d.

Figure 2D:
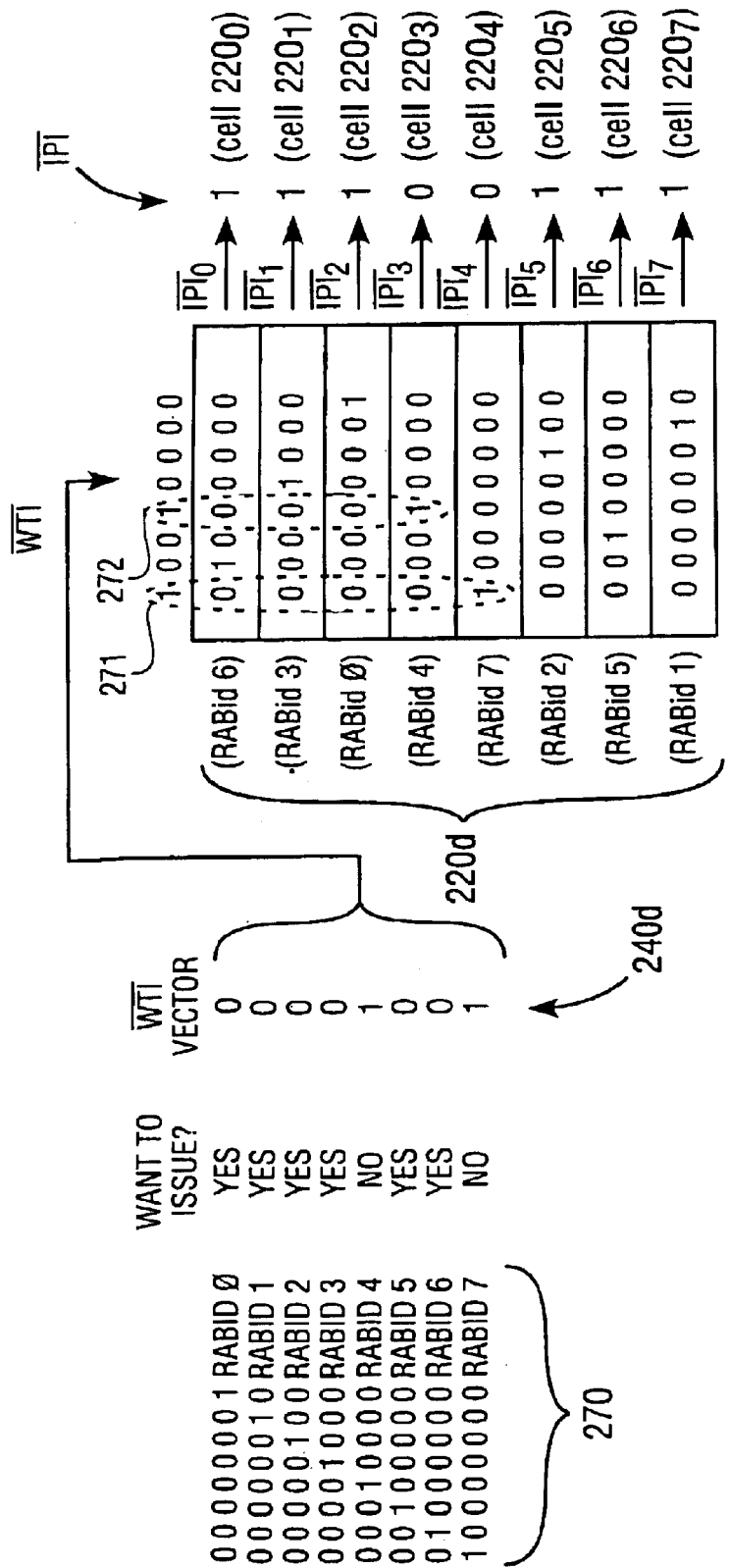
FIG. 2d shows an embodiment of how the CAM 220 of FIG. 2a finds a match between a second input vector and the contents of the CAM 220.

In the example of FIG. 2d, the queue 203 is full. That is, every queue 203 cell holds a RABid value. Because the queue 203 state is mirrored in the CAM 220, the CAM contents 220d of FIG. 2d are also full. FIG. 2d presents the contents 270 of Table 3 (originally shown back in FIG. 3) so the reader can easily correlate the contents 220d of the CAM with the particular order of RABid values that the CAM holds in this example (i.e., RABid:06, RABid:03, RABid:00, etc.).

In the example of FIG. 2d, RABid:04 and RABid:07 do not want to issue. The "don't want to issue" vector, which is configured to indicate that RAB:04 and RAB:07 do not want to issue, is shown atop the CAM contents 220d so that the identification of a match is easily visualized. The CAM identifies which cells have the RABid values that do not want to issue. In the particular example of FIG. 2d, cells $220_3$ and $220_4$ hold RABid:04 and RABid:07. The CAM properly identifies matches 271 and 272 and presents the logical inverse of the "issue pointer issued" (ipi) vector. That is, the CAM cells $220_3$, $220_4$ that identify a match produce an active low output while the all other CAM cells produce an active high output. This effectively produces an "issue pointer not issued" vector 223 as an output.

Note that the CAM embodiment discussed so far employs active low signaling for the input vectors and output vectors. This is due to a transistor level design used to identify a match within the CAM. The CAM's transistor level design for this CAM embodiment is discussed in more detail further ahead. It is important to note, however, that alternate embodiments may employ active high signaling at the CAM's inputs as well as the CAM's outputs.

Referring now to FIG. 2a, whether active high or active low signaling is used, the CAM output 223 that is generated by the comparison of the CAM's contents with the "don't want to issue" (or, alternatively, "want to issue") vector will distinguish which queue cells have RABid values that have issued and which queue cells have RABid values that have not issued. This information is used by the issue pointer logic 217 to properly determine the next issue pointer value.

Figure 3A:
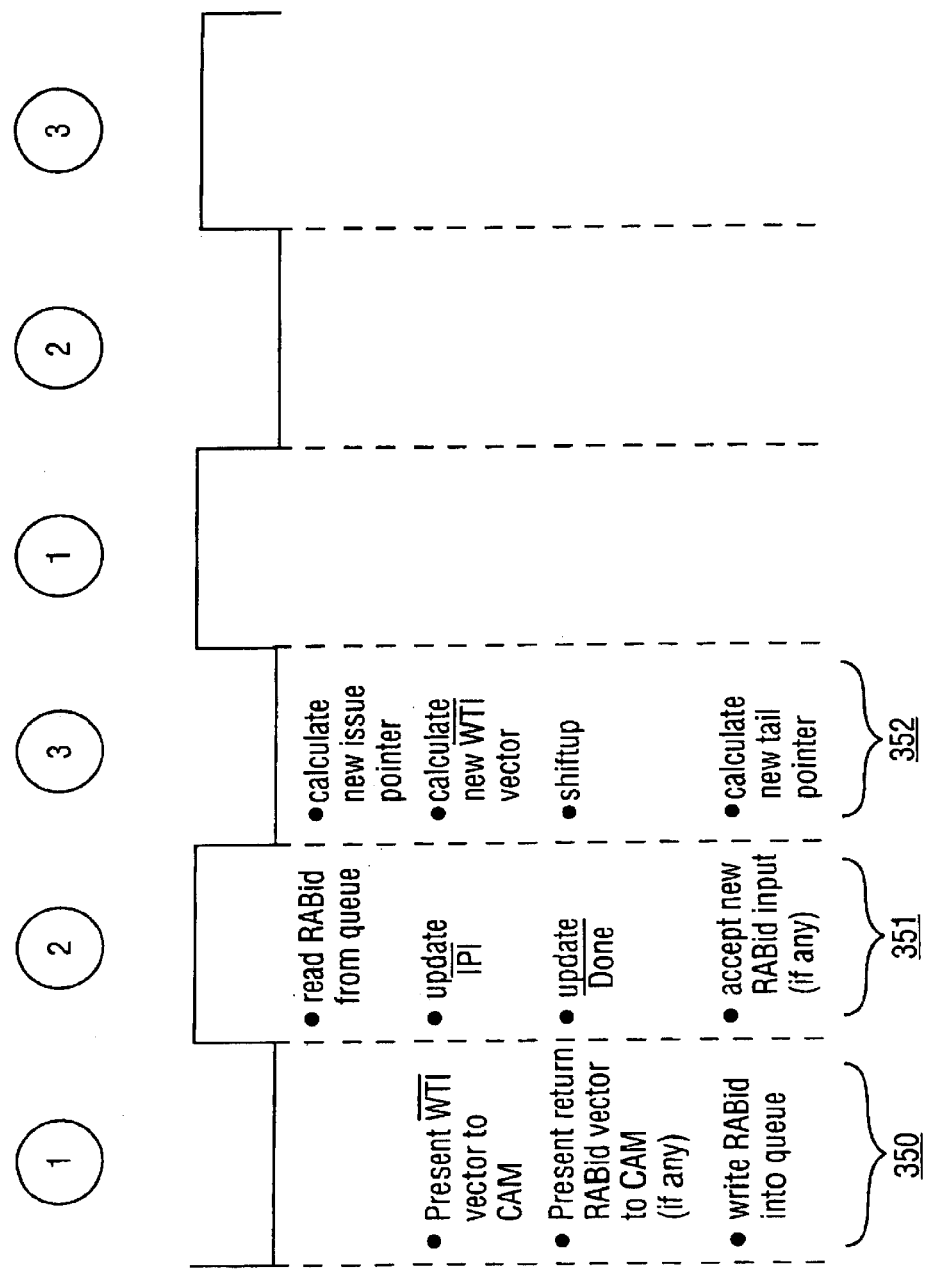
Figure 3B:
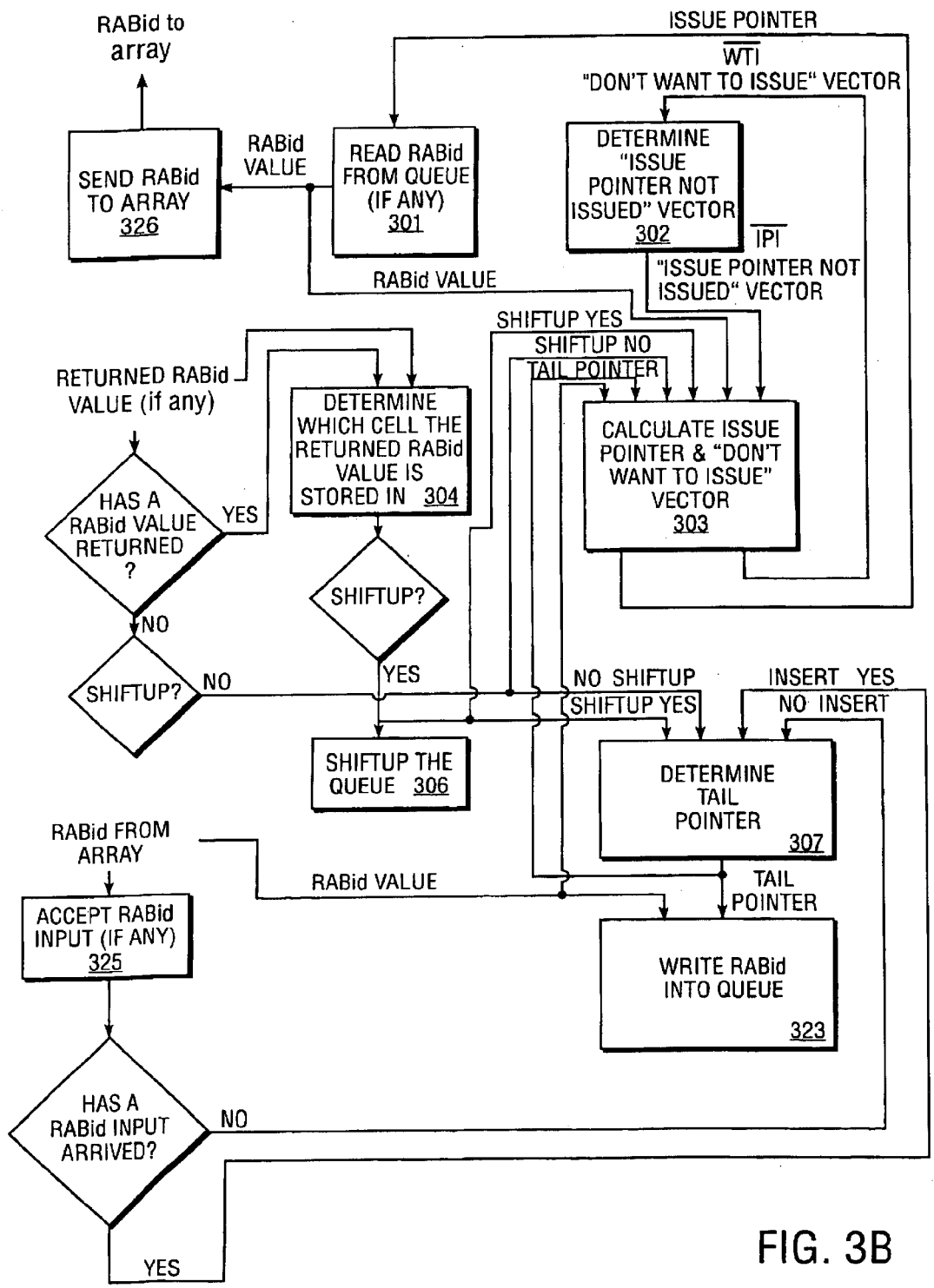

FIGS. 3a and 3b show a methodology for the operation of the array control circuit. FIG. 3a shows an embodiment of the cycling for the array control circuit while FIG. 3b shows a method flow embodiment. Referring to FIGS. 2a, 3a and 3b, during a first cycle time 350: 1) new "don't want to issue" and RABid return vectors are presented to the CAM 220 on their respective bus 222, 224; and 2) a RABid from input 210 (if any) is written 323 into the queue 203 according to the position of the tail pointer.

During a second cycle time 351: 1) a RABid is read from the queue 203 and sent 326 from output 204a to the array; 2) the CAM 220 updates its outputs 302, 304 (in response to the new inputs presented during the first cycle 351) which may effect the signals on the "issue pointer not issued" bus 223 and the shiftup bus 216; and 3) a new RABid is accepted 325 at input 210 (if any).

During a third cycle time 352: 1) the issue pointer logic 217 calculates 303 a new issue pointer and a new "don't want to issue" vector in response to the new "issue pointer not issued" 223 and shiftup 216 bus information; 2) the queue 203 (and CAM 220) are shifted up 306 in response to the new shiftup bus 216 information (if any); and 3) the tail pointer logic 213 calculates 307 a new tail pointer in light of a new RABid input from the array (if any) and the updated shiftup bus 216 information (if any).

Figure 4:
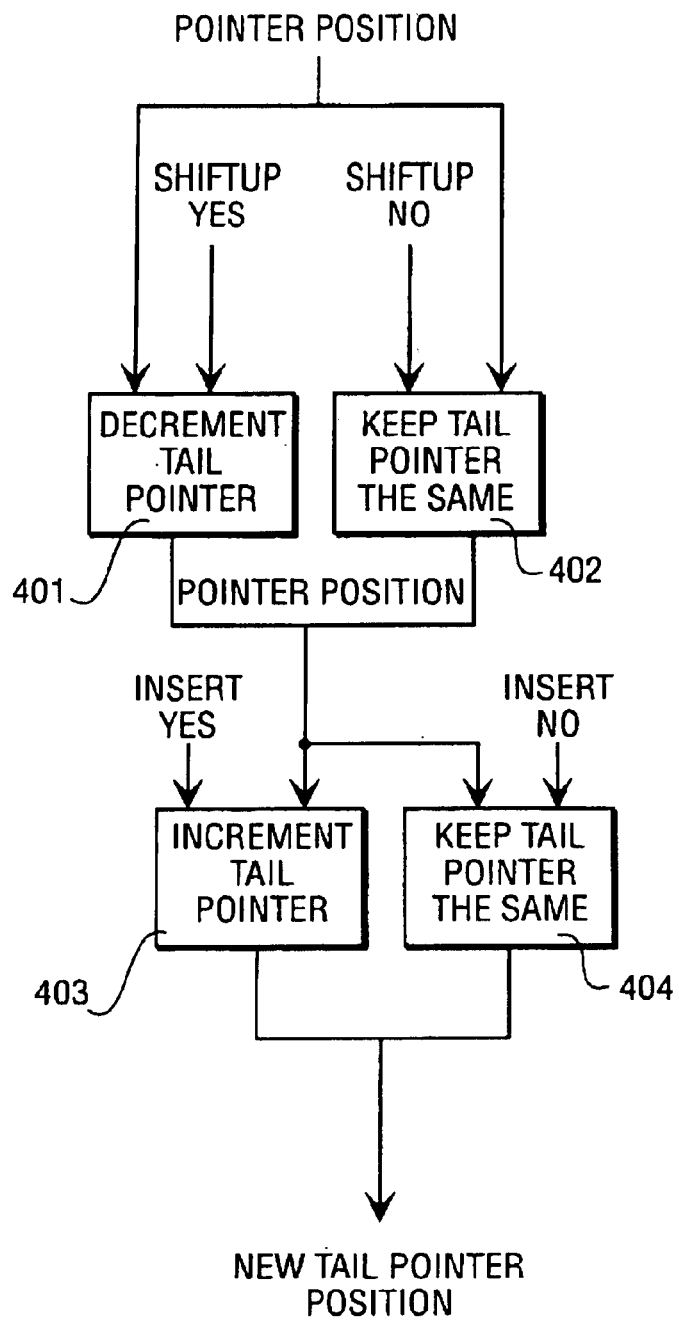
FIG. 4 shows a methodology for determining a tail pointer for a queue.

FIG. 4 shows a methodology for the operation of the tail pointer logic 213. The tail pointer should increment as the queue 203 becomes more populated with RABids and decrement as RABids are cleared from the queue 203 via the shiftup procedure. That is, the tail pointer is responsive to both the occurrence of a shiftup as well as the entry of another RABid at input 210.

The methodology of FIG. 4 indicates this responsiveness. In FIG. 4, the tail pointer decrements 401 (i.e., the tail pointer moves up toward queue cell $203_0$) if a shiftup occurs. Furthermore, if an input RABid is presented at input 210 (also referred to as an "insert") the tail pointer is incremented 403 (i.e., the tail pointer moves toward queue cell $203_7$). The lack of a shiftup causes the tail pointer to hold its value 402 in response to the shiftup bus signal 216. Similarly, the lack of an insert cause the tail pointer to hold its value 404 in response to the insert signal.

Note that the tail pointer does not change (i.e., the new tail pointer value equals the old tail pointer value) if both a shiftup and an insert occurs. Similarly, the tail pointer does not change if neither a shiftup nor an insert occurs. The tail pointer's new value is decremented if a shiftup occurs and no insert occurs. Also, the tail pointer's new value is incremented if an insert occurs but no decrement occurs.

In the embodiment discussed above, the issue pointer logic 217 has two functions that are performed in the third cycle 352. A first function is to calculate the issue pointer that applies to the queue read 301 performed in the next cycle 350. A second function is to calculate the "don't want to issue" vector that is presented to the CAM 220 during the next cycle 350.

Recall that the issue pointer logic 217 is able to support issuing techniques more sophisticated than a simple FIFO technique. For example, the issue pointer logic 217 may be designed to implement a pre-emptive queuing technique. Pre-emptive queuing involves the prioritization of at least one RABid value over other RABid values. Before discussing pre-emptive queuing, however, simple FIFO servicing of queue 203 will be discussed.

As discussed, RABids are issued from queue 203 according to the value of an issue pointer that "points" to the cell holding the RABid to be issued. The issue pointer advances to the next location after the issuance of the RABid that is currently pointed to. To implement a simple FIFO, the next location corresponds to the RABid value that entered the array control circuit input 210 just after the RABid value that is currently pointed to.

A distinction should be drawn, however, between relative advancement and actual advancement. Relative advancement is advancement in light of the RABid values being pointed to. Actual advancement is advancement in light of the queue 203 cell that is being pointed to. Because of the shiftup capability of the queue 203, it is possible to have relative advancement without actual advancement as well as actual advancement without relative advancement.

An example of the former is if the issue pointer stays fixed upon a particular cell and the queue 203 shifts up into that cell. Here, the RABid value being pointed to has changed but the cell being pointed to has not changed. An example of the later is if the issue pointer shifts up along with the RABid value in the queue 203 cell being pointed to (i.e., both the queue 203 and the issue pointer shiftup simultaneously). Here, although the issue pointer has actually advanced to a higher cell, the issue pointer is still pointing to its original RABid value.

Figure 5A:
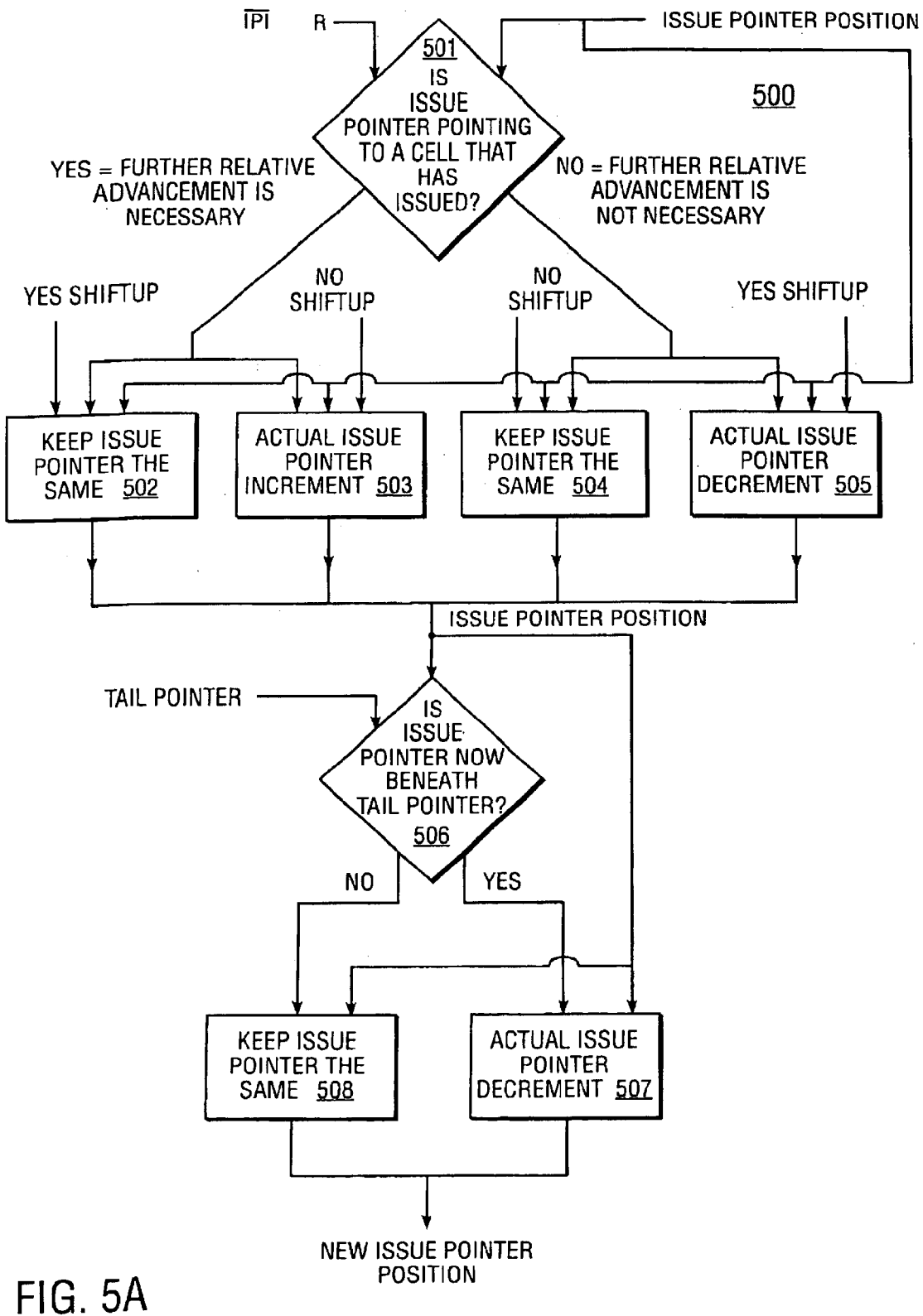
FIG. 5a shows a methodology for determining an issue pointer for a queue.

FIG. 5a shows a methodology 500 that may be used to determine the issue pointer for a simple FIFO queuing scheme. The methodology of FIG. 5a assumes the queue 203 and CAM 220 have already performed a shiftup (if any). The methodology of FIG. 5a may be modified, however, to account for a later rather than prior shiftup. For a simple FIFO, if the issue pointer points to a cell storing an issued RABid value, the issue pointer should exercise relative advancement. That is, the next RABid that has not issued should be pointed to. If the issue pointer points to a cell holding a RABid value that has not issued, the issue pointer should not exercise relative advancement and simply issue the RABid value being to. Frequently, the issue pointer is initially pointed at a cell holding an issued RABid because the issue pointer still points to the cell that just issued as the result of the pointer's present position.

The issue pointer logic 217 can determine 501 whether or not the pointed to cell has issued by comparing the "issue pointer not issued" vector against the issue pointer position. If the cell pointed to by the issue pointer has a logic low value in the "issue pointer not issued" vector, the cell corresponds to a RABid that has issued. If the cell pointed to by the issue pointer has a logic high value in the "issue pointer not issued" vector, the cell corresponds to a RABid that has not issued.

Whether or not the issue pointer actually advances (i.e., actually increments its position) will depend upon the presence of a shiftup for both relative advancement and no relative advancement. For relative advancement, the issue pointer should hold its position 502 if a shiftup occurred and actually increment 503 if no shiftup occurred. If relative advancement is not needed, the pointer value should hold its position 504 if no shiftup occurred and actually decrement 505 if a shiftup occurred.

Referring briefly to FIG. 2a, note that the shiftup signals SHIFTUP0 through SHIFTUP6 associated with the shiftup bus 216 are directed to the issue pointer logic 217. Whether or not a shiftup occurred for the methods discussed just above depends upon the position of the issue pointer in light of the status of the shiftup signals SHIFTUP0 through SHIFTUP6. It is possible that even though a shiftup occurred in the queue 203 and the CAM 220, the method 500 of FIG. 5a properly executes according to a "no shiftup" condition (e.g., increment 503 or hold 504).

For example, if the issue pointer points to cell $203_2$ but a shiftup only occurred in cells $203_5$ and $203_6$, the shiftup has no relative effect on the RABid values pointed to by the issue pointer. As such, a shiftup condition arises for purposes of executing the method 500 of FIG. 5a only if the cell being pointed by the issue pointer has lower data shifted into it by the shiftup. That is, for method 500, a shiftup is deemed to have occurred only if the issue pointer points to a cell having an active shiftup signal. As such, before making a determination as to whether or not a shiftup occurred, the issue pointer method 500 should check the shiftup signal of the cell being pointed to. If a shiftup occurred at that cell, then a "yes shiftup" condition arises. If a shiftup did not occur at that cell, a "no shiftup" condition arises.

Furthermore, regardless if relative advancement is necessary or if a shiftup condition arises, the issue pointer should be checked against the tail pointer to ensure that the issue pointer has not actually advanced beyond the tail pointer. In heavy traffic situations, the queue 203 begins to fill up with RABids which drives the tail pointer toward the lowest cell $203_7$. Here, the issue pointer is typically higher than the tail pointer which reflects the delay experienced by the RABids while waiting in the queue 203.

In low traffic situations, the tail pointer and issue pointer may meet at the same cell (e.g., when the queue is empty and waiting for the arrival of a RABid from the array). The issue pointer should not fall below the tail pointer, however, if proper ordering of issues is to be preserved. Thus, the position of the issue pointer is checked 506 against the position of the tail pointer. If the tail pointer is above the issue pointer, the issue pointer actually decrements 507 (bringing the issue pointer even with the tail pointer). If the issue pointer is not below the tail pointer, the issue pointer may keep 508 the position determined before the check 506 was made.

Referring to FIG. 2a, once the new issue pointer is forwarded to the read address logic 212, the corresponding RABid is read from the cell pointed to by the new issue pointer. The issue pointer logic 217 is coupled to the read data bus 234 so that the RABid value of the cell being read can be identified. Recall that the issue pointer logic 217 is also responsible for generating the "don't want to issue" vector. The RABid value of the cell being read is used to generate the "don't want to issue" vector.

Figure 5B:
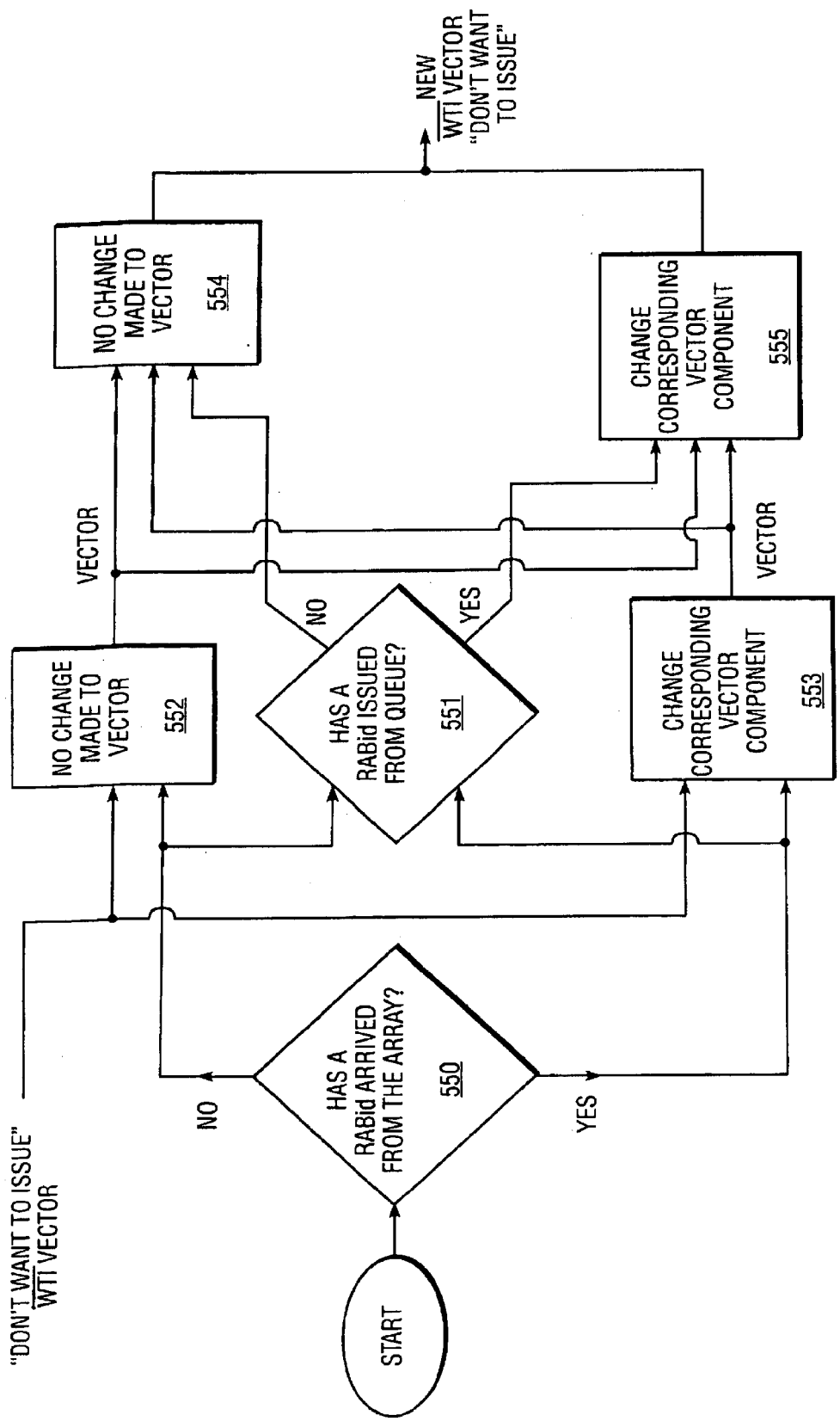
FIG. 5b shows a methodology for determining a vector indicative of which data structures within a queue desire to be issued from the queue.

FIG. 5b shows a methodology 510 that may be used to generate the "don't want to issue" vector. The "don't want to issue" vector may be formed by: 1) accounting for the arrival of new RABid values to the queue 203 from the array; and 2) accounting for the issuing of RABid values from the queue 203 to the array.

When a RABid value is sent from the array to the queue 203, the "don't want to issue" vector should reflect that the newly arrived RABid value wants to issue. That is, while a RABid value is not being used by the array control circuit (i.e., its value does not appear in the queue 203 or CAM 220) it has no desire to issue. As a result, the value of the "don't want to issue" vector component that corresponds to this RABid value is a logic high.

Once the RABid value is offered to the array control circuit 207 (via input 210) and subsequently written into the queue 203, its status changes from not desiring an issue to desiring an issue. The issue pointer logic 217 should therefore reflect this change of status by toggling the "don't want to issue" vector component bit from a logic high to a logic low for the new RABid value. Consistent with the above description, in the methodology 510 of FIG. 5b, it is first determined 550 whether or not a new RABid has arrived (e.g., via net 290 of FIG. 2a). If so, the status of the "don't want to issue" vector component that corresponds to the newly arrived RABid is changed 553. If not, the vector does not change 552.

When a RABid value is sent from the queue 203 to the array, the "don't want to issue" vector should reflect that the issued RABid value no longer wants to issue. That is, while a RABid value is waiting in the queue 203 it desires to issue to the array. As a result, while the RABid is waiting in the queue 203, the "don't want to issue" vector component that corresponds to this RABid value is a logic low.

Once the RABid value is issued to the array from the queue 203, its status changes from desiring an issue to not desiring an issue. The issue pointer logic 217 should therefore reflect this change of status by toggling the "don't want to issue" vector component bit from a logic low to a logic high for the issued RABid value. Consistent with the above description, in the methodology 510 of FIG. 5b, it is next determined 551 whether or not a RABid has issued (e.g., via net 291 of FIG. 2a). If so, the status of the "don't want to issue" vector component that corresponds to the newly arrived RABid is changed 555. If not, the vector does not change 554. The result of the process 510 is the new "don't want to issue" vector that will be forwarded to the CAM 220. Alternate embodiments may check 551 for an issued RABid before checking 550 for a newly arriving RABid.

The discussion so far supports mostly FIFO queuing techniques. However, as mentioned above, the array control circuit 207 of FIG. 2a can be used to support more complicated techniques such as pre-emptive queuing. Recall that pre-emptive queuing involves prioritizing at least one RABid over other RABids. For example, some instruction fetches may correspond to "demand" fetches while other instruction fetches may correspond to normal fetches. In an embodiment, demand fetches are used for instructions that will prevent or remove the processor from a condition where it is has to miss execution cycles because it is has not yet fetched a particular instruction (a condition commonly referred to as starvation).

Since the processor may soon reach a starve condition (or can't correct a starve condition) before the particular instruction is fetched, the processor "demands" the particular instruction and it is given higher priority over other instructions. The RABid that corresponds to the demanded instruction is labeled as a "demand" RABid. A demand RABid, being high priority, is issued to the array before other RABids even though other RABids were presented to the array control circuit input 210 prior to the arrival of the demand RABid.

Figure 5C:
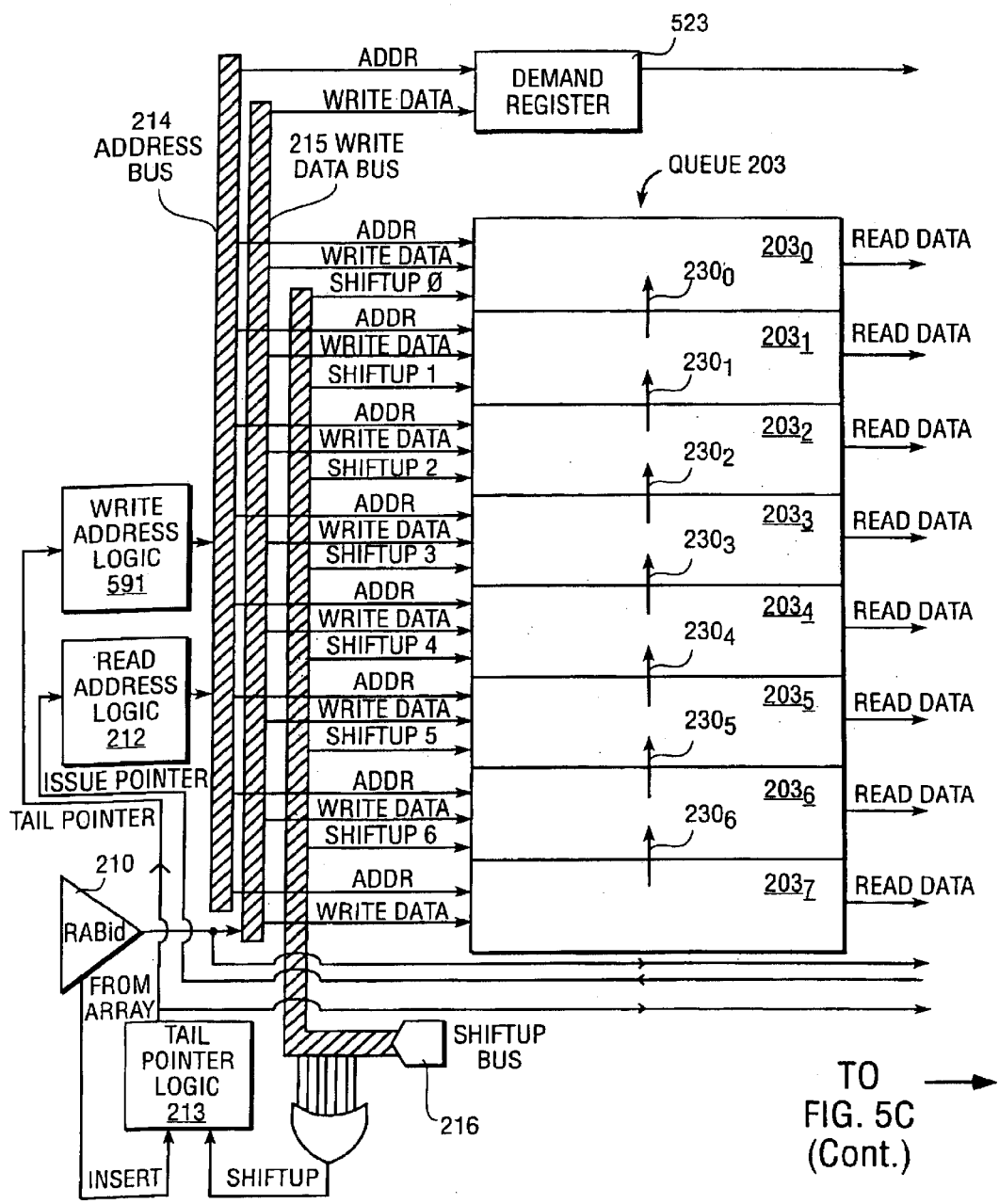
FIG. 5c shows an embodiment of an array control circuit configured to perform pre-emptive queuing.
Figure 5C:
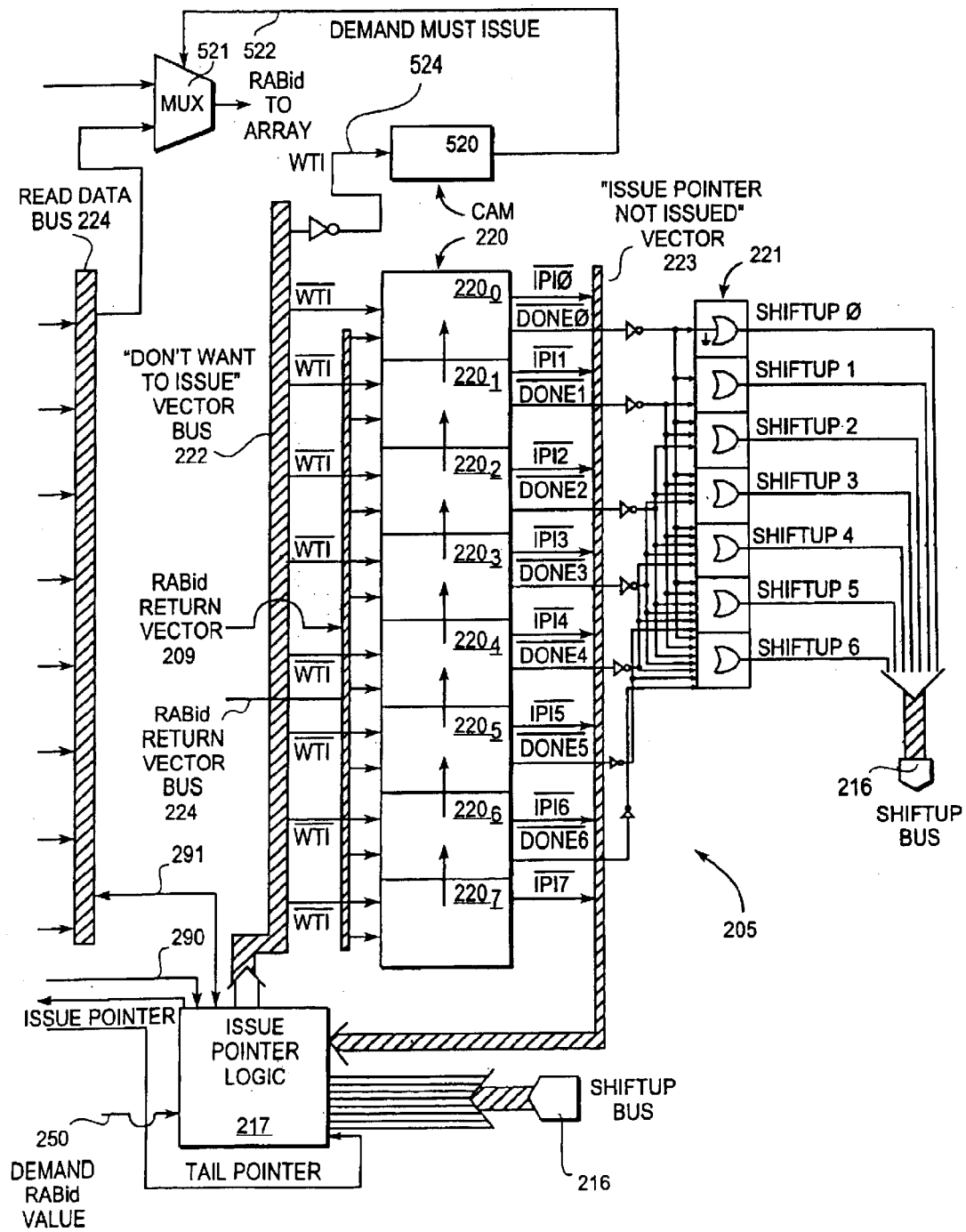

FIG. 5c shows a modified version 590 of the array control circuit 207 that is configured to preemptively queue RABids given a "demand" status. The modifications include the addition of a demand register 523 and the addition of another CAM cell 520. Demand register 523 holds those RABids that are given demand status. Note that demand RABids enter input 210 having already been given demand status are identified in some manner as having demand status. In an embodiment, when a demand RABid enters the modified array control circuit 590, the write address logic 591 is configured to write the RABid in both the demand register 523 and the queue 203 cell being pointed to by the tail pointer.

This allows the logic that determines which RABids are demand RABids to change the status of a demand RABid to a normal RABid. For example, consider a case where a first demand RABid enters input 210 and is written in both the demand register 523 and a queue 203 cell. If the logic that determines RABid status decides that a subsequent RABid to be entered at input 210 should be given higher priority than the current demand RABid, the logic sends the subsequent RABid to input 210 as a demand RABid (i.e., a second demand RABid).

Following the procedure for demand RABids, write address logic 591 writes the second demand RABid into the demand register 523 and the queue 203 cell pointed to by the tail pointer. If the first demand RABid within the demand resister 523 has not yet issued to the array, the writing of the second RABid into the demand register 523 effectively erases the first demand RABid from the demand register. However, since the first RABids is also stored in the queue 203, the RABid value corresponding to the first demand RABid is still stored with the array control circuit queue 203 and CAM 220. This drops the status of the first demand RABid from a demand RABid to a normal RABid.

Another modification is the addition of multiplexor 521 that sends issued RABids to the array. Multiplexor 521 is configured to send a demand RABid from the demand register 523 to the array if the demand register 523 is populated; or send a normal RABid from the read data bus 224 to the array if the demand register is not populated. The signal 522 that controls whether the demand register 523 contents or read data bus 224 contents are sent to the array is determined by additional CAM cell 520.

Additional CAM cell 520 stores the value of the RABid that is within the demand register 523. Note that in the embodiment of FIG. 5c, the input to CAM cell 520 is the inverse of the "don't want to issue" vector. That is, CAM cell 520 is presented with the logical equivalent of a "want to issue" vector (wti). Recall the description above with respect to FIG. 5b regarding the methodology 510 used to determine the "don't want to issue" vector. When a newly entered RABid value arrives at input 210, the "don't want to issue" vector changes the value that corresponds to the new RABid value in such a manner that it reflects the new RABid value's desire to issue (e.g., the "don't want to issue" vector toggles the corresponding RABid value bit from a 1 to a 0).

When a RABid value that is written into the demand register is also written into queue 203, the "don't want to issue" vector is affected as described just above. By inverting the "don't want to issue" vector before presenting it to CAM cell 520, the new RABid value (which is also in demand register 523) component of the vector is a logic high at cell input 524. CAM cell 520 then positively identifies a match (similar to the manner described with respect to FIGS. 2c and 2d) which produces the "demand must issue" signal 522. By configuring multiplexor 521 to send the contents of the demand register 523 to the array when CAM cell 520 discovers a match, the RABid within the demand register 523 is preemptively queued over other RABid values.

Figure 5D:
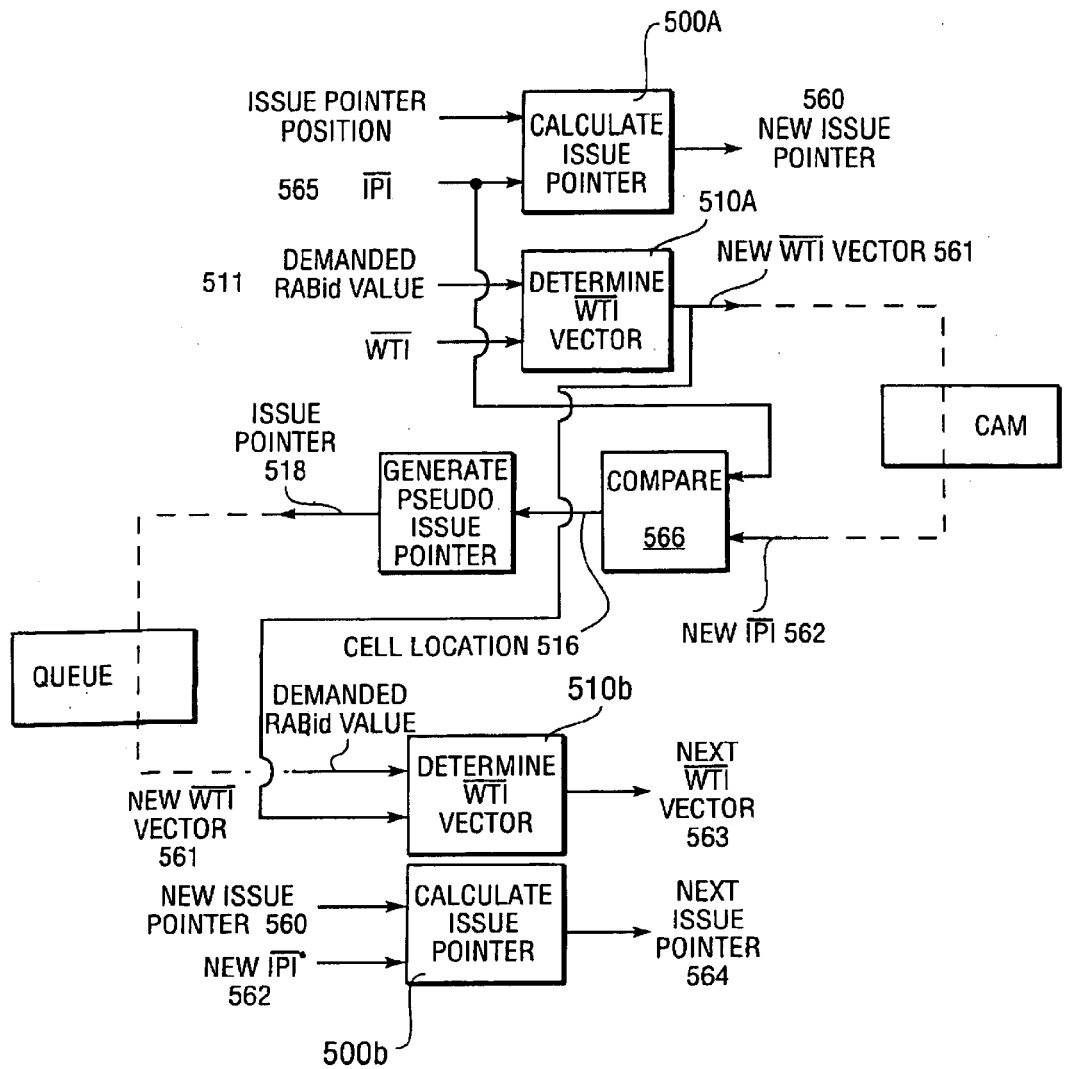
FIG. 5d shows a methodology that may be used for another pre-emptive queuing embodiment.

In another pre-emptive embodiment, shown in FIG. 5d, a normal RABid already waiting in queue 203 may be instantaneously declared as a demand RABid. This changes the status of the particular RABid value from normal priority to high priority. In this embodiment, one may refer to the circuit 207 of FIG. 2a. This approach may also be used for RABids given a demand status before entering at input 210. Here, the issue pointer logic 217 is configured to direct its next issue pointer to the queue 203 cell holding the demanded RABid value. Note that, as seen in FIG. 2a, the processor may enter the demanded RABid value at input 250 (which may also be coupled to input 210).

Referring to FIG. 5d, when a particular RABid value 511 is demanded, the issue pointer logic 217 generates 510a a "don't want to issue" vector 561 according to the methodology 510 discussed with respect to FIG. 5b. The process 510a will generate a new "don't want to issue" vector 561 that reflects the demanded RABid value 511 desires to issue. Subsequently, the "issue pointer not issued" vector 562 generated from the new "don't want to issue" vector 561 will be different than the original "issue pointer not issued" vector 565.

The difference between the two vectors 562, 565 will be at the vector component corresponding to the cell location the demanded RABid has been stored in. Thus, the two vectors 562, 565 are compared 566 which produces the cell location 516 holding the demanded RABid value. The issue pointer logic 217 simply uses this cell location 516 to properly read the demanded RABid value from the queue. The demanded RABid value is preemptively queued as a result. New issue pointer 560 is suspended until the next issue pointer calculation sequence.

The RABid is then directed to the array and the demanded RABid value returns to the issue pointer logic. The issue pointer logic determines 510b (according to process 510 of FIG. 5b) the next "don't want to issue" vector 563 in light of the demanded RABid value and the new "don't want to issue" vector 561. The issue pointer logic also calculates 500b (according to process 500 of FIG. 5a) the next issue pointer 564 using the new issue pointer 560 that was previously suspended and the new "issue pointer issued" vector 562.

Note that the methodology 500 of FIG. 5a is robust enough to handle a shiftup that may occur while the preemptive queuing takes places. That is, a shiftup may cause the new issue pointer value 560 to point to a cell having a RABid value that has not issued. In this case, no relative advancement is needed. If two shiftups occurs in series (i.e., once before issue pointer 518 is determined and once before the next "don't want to issue" vector 563 is determined 510b), the second shiftup may be suspended or delayed (which may require queuing before input 210) so the next "don't want to issue" vector 563 points to the proper value.

Figure 6:
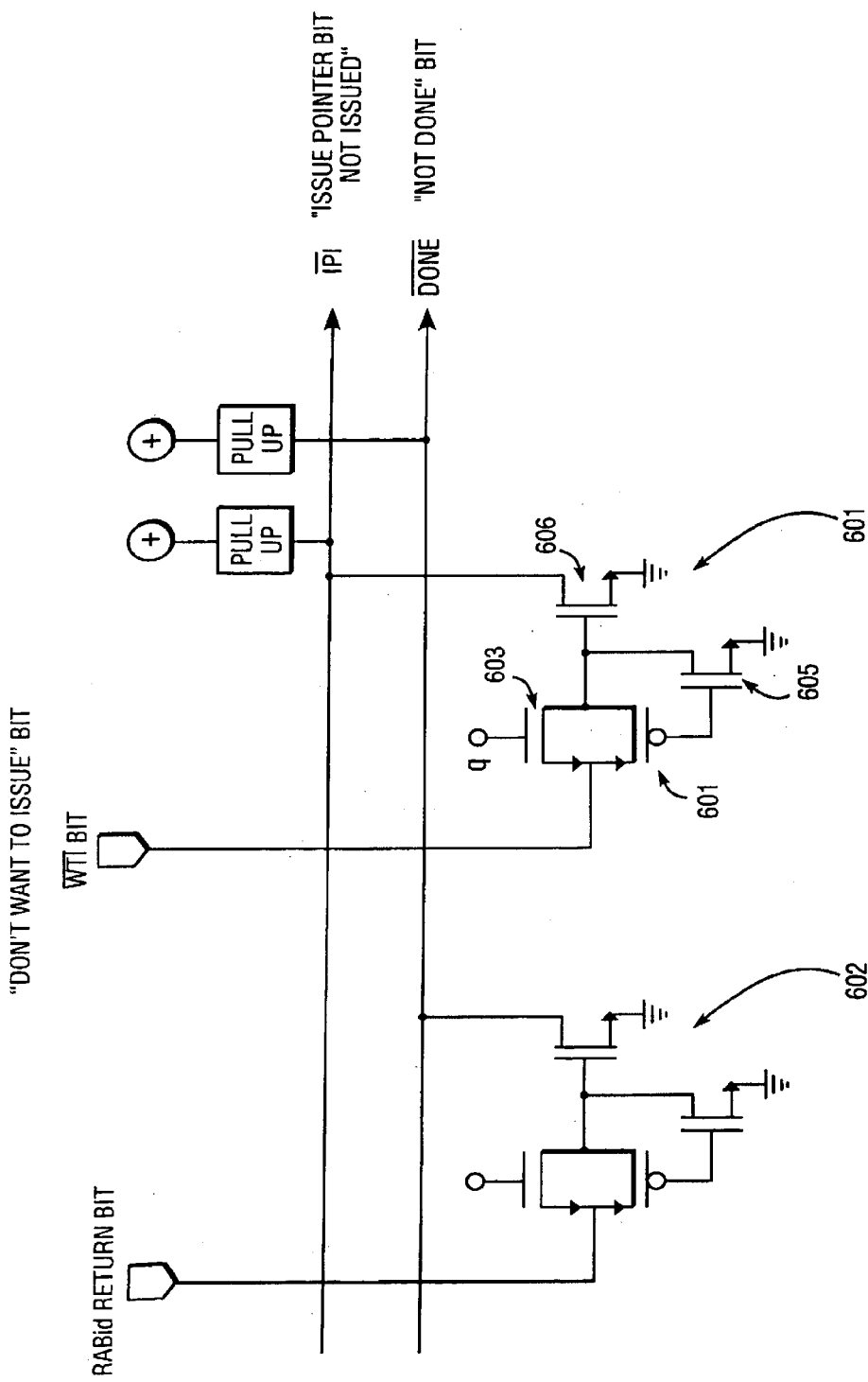

FIG. 6 shows an embodiment of a CAM cell design that may be used to perform the CAM operations discussed above. Recall that in embodiments discussed above, CAM 220 finds a match between its cell contents and the input "don't want to issue" and RABid return vectors. Examples of the matching were shown in FIGS. 2c and 2d. Also note that both matches are performed simultaneously (referring briefly to cycle 351 in FIG. 3a).

In order to perform simultaneous matching, parallel circuits may be designed. A first parallel circuit can identify a match between the "don't want to issue" vector and the cell contents while a second parallel circuit can identify a match between the RABid return vector and the cell contents. FIG. 6 shows parallel circuits consistent with this approach. In FIG. 6, circuit 601 is the first parallel circuit (as defined above) while circuit 602 is the second parallel circuit (as defined above).

Recall that in the matching approaches discussed in FIGS. 2c and 2d, the CAM need only find a match of logic high values between the input vectors and the cell data. Circuits 601, 602 are configured to pull down their respective output nodes "issue pointer not issued", and "not done" only if matching logical high values exist. The gate q of transistor 603 corresponds to a bit of the RABid value stored in the cell. The sources of transistors 603, 604 are coupled to a bit of the "don't want to issue" vector. In an embodiment having vector sizes and RABid value sizes of eight bits, the circuits 601, 602 are repeated eight times for each cell.

When the "don't want to issue" bit and q bits are high, transistor 604 is "on" and transistor 603 is "off". If transistor 604 is "on", the gate node of transistor 604 is low which turns "off" transistor 605. Also, if transistor 604 is "on", the logic high value at the source of transistor 604 is observed at the drain of transistor 604. The combination of logic high voltage at the drain of transistor 604 and logic low voltage at transistor 605 provides the gate of transistor 606 with a logic high voltage. A logic high voltage at the gate of transistor 606 turns transistor 606 "on" which pulls down the output "issue pointer not issued" bit. In all cases other than logical high values at both the "don't want to issue" bit and the q bit, transistor 606 is "off". Since the "issue pointer not issued" bit output is coupled to a pull up, the output will be logic high for all these cases. Circuit 602 operates similarly to circuit 601. As such both circuits 601, 602 help properly find a match of logic high between the input vectors and the cell data.

What is claimed is:

1. A processor, comprising:
   a) an array to hold addresses of instructions waiting to be fetched; and,
   b) an array control circuit to control the order in which said addresses are sent from said array, said array control circuit comprising:
      a plurality of content addressable memory (CAM) cells, said plurality of CAM cells capable of holding a plurality of data structures from a pool of data structures, each data structure of said plurality of data structures pointing to a different location of said array that is holding an instruction address, said plurality of CAM cells comprising an input to receive an input vector that is capable of indicating which data structures of said plurality of data structures desire to issue from said plurality of CAM cells, said plurality of CAM cells further comprising an output to provide an output vector that indicates which of said plurality of CAM cells contain those of said one or more data structures that have issued from said plurality of CAM cells.

2. The processor of claim 1 wherein said plurality of CAM cells further comprise an input to receive a second input vector that identifies a particular location within said array from which an instruction address emanated so that its corresponding address could be fetched.

3. The processor of claim 2 wherein said plurality of CAM cells further comprise an output to provide a second output vector that identifies a particular CAM cell that stores the data structure that points to said particular location.

4. The processor of claim 3 wherein a neighboring CAM cell of said particular CAM cell is coupled to said particular CAM cell so that a data structure held by said neighboring CAM cell can be shifted into said particular CAM cell as a consequence of said particular CAM cell being indicated by said second output vector.

5. The processor of claim 4 wherein said processor is communicatively coupled to a memory structure.

6. A processor, comprising:
   a) an array to hold addresses of instructions waiting to be fetched; and,
   b) an array control circuit to control the order in which said addresses are issued from said array, said array control circuit comprising:
      (i) a plurality of content addressable memory (CAM) cells, said plurality of CAM cells capable of storing a plurality of data structures from a pool of data structures, each data structure of said plurality of data structures pointing to a different location of said array that is holding an instruction address, said plurality of CAM cells comprising an input to receive an input vector that is capable of indicating which data structures of said plurality of data structures desire to issue from said plurality of CAM cells, said plurality of CAM cells further comprising an output to provide an output vector that indicates which of said plurality of CAM cells contain those of said one or more data structures that have issued from said plurality of CAM cells; and (ii) a plurality of queue cells, said plurality of queue cells to also store said one or more data structures, said plurality of queue cells having an input to enter a data structure from said pool of data structures into one of said plurality of queue cells, said plurality of queue cells having an output to issue one of said one or more data structures from one of said plurality of queue cells, said data structure that is entered into said one of said plurality of queue cells having a value that corresponds to a location within said array where an instruction address that is newly added to said array is located within said array, said data structure that is issued from said one of said queue cells having a value that corresponds to a location within said array where an instruction address that is to be next sent from said array is located within said array.

7. The processor of claim 6 wherein said plurality of CAM cells further comprise an input to receive a second input vector that identifies a particular location within said array from which an instruction address issued so that its corresponding address could be fetched.

8. The processor of claim 7 wherein said plurality of CAM cells further comprise an output to provide a second output vector that identifies a particular CAM cell that stores the data structure that points to said particular location.

9. The processor of claim 8 wherein a neighboring queue cell of said queue cell to have its data structure issued is coupled to said queue cell to have its data structure issued so that a data structure held by said neighboring queue cell can be shifted into said queue cell to have its data structure issued as a consequence of said particular CAM cell being indicated by said second output vector.

10. The processor of claim 6 wherein said array control circuit further comprises a register to store a demand status data structure and an additional CAM cell to store said demand status data structure, wherein said demand status data structure points to a location within said array where an address for a high priority instruction is held.

11. The processor of claim 10 wherein a match identified by said additional CAM cell that stores said demand status data structure causes said high priority instruction to be fetched.

12. The processor of claim 6 wherein said processor is communicatively coupled to a memory structure.

13. The processor of claim 6 wherein said plurality of queue cells and said plurality of CAM cells form a plurality of cells, each cell of said plurality of cells to act as both a CAM cell and a queue cell.

14. The processor of claim 13 wherein said plurality of cells further comprise an input to receive a second input vector that identifies a particular location within said array from which an instruction address issued so that its corresponding address could be fetched.

15. The processor of claim 13 wherein said plurality of cells further comprise an output to provide a second output vector that identifies a particular cell that stores the data structure that points to said particular location.

16. The processor of claim 15 wherein a neighboring cell of said particular cell is coupled to said particular cell so that a data structure held by said neighboring cell can be shifted into said particular cell as a consequence of said particular cell being indicated by said second output vector.

17. The processor of claim 13 wherein said array control circuit further comprises a register to store a demand status data structure and a cell in addition to said plurality of cells to store said demand status data structure, wherein said demand status data structure points to a location within said array where an address for a high priority instruction is held.

18. The processor of claim 17 wherein a match identified by said additional cell causes said high priority instruction to be fetched.

19. The processor of claim 13 wherein said processor is communicatively coupled to a memory structure.

20. A method, comprising:
a) sending an input vector to a plurality of content addressable memory (CAM) cells, said input vector identifying specific data structures that are stored within said CAM cells and that identify those locations within an array where an address for an instruction waiting to be fetched is held;
b) comparing said input vector against the contents of each of said plurality of CAM cells; and,
c) generating an output vector from said plurality of CAM cells that reflects the result of said comparing, said output vector identifying each of those CAM cells that is storing one of said data structures.

21. The method of claim 20 further comprising providing a second input vector to said plurality of CAM cells, said second input vector indicating a particular location within said array from where an instruction address issued so that its corresponding instruction could be fetched.

22. The method of claim 21 further comprising comparing said second input vector against the contents of each of said plurality of CAM cells, and, generating a second output vector that reflects the result of said comparing, said second output vector identifying a particular CAM cell that stores the data structure that points to said particular location.

23. The method of claim 22 further comprising shifting into said particular CAM cell the contents of a CAM cell that neighbors said particular CAM cell.

24. The method of claim 23 further comprising fetching an instruction from a memory structure by issuing an instruction address from a location of said array that is identified by one of said data structures.

25. The method of claim 20 further comprising:
entering a first data structure into a first queue cell of a plurality of queue cells, said first data structure having a value that corresponds to a location within said array where an instruction address that has been newly added to said array is located within said array; and,
issuing a second data structure from a second queue cell of said plurality of queue cells, said second data structure having a value that corresponds to a location within said array where an instruction address that is to be next issued from said array is located within said array.

26. The method of claim 25 further comprising shifting a data structure from a neighboring queue cell of said second queue cell into said second queue cell as a consequence of said issuing of said second data structure from said second queue cell.

27. The method of claim 25 wherein said newly added instruction address is a high priority instruction address, said method further comprising also entering said first data structure into a register and an additional CAM cell.

28. The method of claim 27 further comprising issuing said first data structure from said register in response to a match being indicated at the output of said additional CAM cell.

29. The method of claim 25 further comprising fetching an instruction from a memory structure by issuing an instruction address from a location of said array that is identified by one of said data structures.

30. The method of claim 25 wherein said plurality of CAM cells and said plurality of queue cells form a plurality of cells, wherein each of said cells acts as both a said CAM cell and a said queue cell.

31. The method of claim 30 further comprising providing a second input vector to said plurality of cells, said second vector indicating a particular location within said array from where an instruction address emanated so that its corresponding instruction could be fetched.

32. The method of claim 31 further comprising comparing said input vector against the contents of each of said plurality of cells, and, generating a second output vector that reflects the result of said comparing, said second output vector identifying a particular cell that stores the data structure that points to said particular location.

33. The method of claim 32 further comprising shifting into said particular cell the contents of a cell that neighbors said particular cell.

34. The method of claim 30 wherein said newly added instruction address is a high priority instruction address, said method further comprising also entering said first data structure into a register and an additional CAM cell.

35. The method of claim 34 further comprising issuing said first data structure from said register in response to a match being indicated at the output of said additional CAM cell.

36. The method of claim 30 further comprising fetching an instruction from a memory structure by issuing an instruction address from a location of said array that is identified by one of said data structures.

37. A processor, comprising:
   a) an array to hold addresses of instructions waiting to be fetched; and,
   b) an array control circuit to control the order in which said addresses are sent from said array, said array control circuit comprising:
      (i) a plurality of content addressable memory (CAM) cells, said plurality of CAM cells capable of storing a plurality of data structures from a pool of data structures, each data structure of said plurality of data structures pointing to a different location of said array that is holding an instruction address, said plurality of CAM cells comprising an input to receive an input vector that is capable of indicating which data structures of said plurality of data structures desire to issue from said plurality of CAM cells, said plurality of CAM cells further comprising an output to provide an output vector that indicates which of said plurality of CAM cells contain those of said one or more data structures that have issued from said plurality of CAM cells; and
      (ii) a register to store a demand status data structure and an additional CAM cell to store said demand status data structure, wherein said demand status data structure points to a location within said array where an address for a high priority instruction is held.

38. The processor of claim 37 wherein a match identified by said additional CAM cell that stores said demand status data structure causes said high priority instruction to be fetched.

39. The processor of claim 37 wherein said plurality of CAM cells further comprise an input to receive a second input vector that identifies a particular location within said array from which an instruction address issued so that its corresponding address could be fetched.

40. The processor of claim 39 wherein said plurality of CAM cells further comprise an output to provide a second output vector that identifies a particular CAM cell that stores the data structure that points to said particular location.

41. The processor of claim 40 wherein a neighboring CAM cell of said particular CAM cell is coupled to said particular CAM cell so that a data structure held by said neighboring CAM cell can be shifted into said particular CAM cell as a consequence of said particular CAM cell being indicated by said second output vector.

42. The processor of claim 37 wherein said array control circuit further comprises a plurality of queue cells, said plurality of queue cells to also store said one or more data structures, said plurality of queue cells having an input to enter a data structure from said pool of data structures into one of said plurality of queue cells, said plurality of queue cells having an output to issue one of said one or more data structures from one of said plurality of queue cells, said data structure that is entered into said one of said plurality of queue cells having a value that corresponds to a location within said array where an instruction address that is newly added to said array is located within said array, said data structure that is issued from said one of said queue cells having a value that corresponds to a location within said array where an instruction address that is to be next sent from said array is located within said array.

43. The processor of claim 42 wherein said plurality of queue cells and said plurality of CAM cells form a plurality of cells, each cell of said plurality of cells to act as both a CAM cell and a queue cell.

44. A computing system, comprising:
   an L2 cache coupled to a processor, said processor comprising:
      a) an array to hold addresses of instructions waiting to be fetched; and,
      b) an array control circuit to control the order in which said addresses are sent from said array, said array control circuit comprising a plurality of content addressable memory (CAM) cells, said plurality of CAM cells capable of holding a plurality of data structures from a pool of data structures, each data structure of said plurality of data structures pointing to a different location of said array that is holding an instruction address, said plurality of CAM cells comprising an input to receive an input vector that is capable of indicating which data structures of said plurality of data structures desire to issue from said plurality of CAM cells, said plurality of CAM cells further comprising an output to provide an output vector that indicates which of said plurality of CAM cells contain those of said one or more data structures that have issued from said plurality of CAM cells.

45. The computing system of claim 44 wherein said plurality of CAM cells further comprise an input to receive a second input vector that identifies a particular location within said array from which an instruction address emanated so that its corresponding address could be fetched.

46. The computing system of claim 45 wherein said plurality of CAM cells further comprise an output to provide a second output vector that identifies a particular CAM cell that stores the data structure that points to said particular location.

47. The computing system of claim 46 wherein a neighboring CAM cell of said particular CAM cell is coupled to said particular CAM cell so that a data structure held by said neighboring CAM cell can be shifted into said particular CAM cell as a consequence of said particular CAM cell being indicated by said second output vector.

48. The computing system of claim 47 wherein said processor is communicatively coupled to a memory structure.

* * * * *